United States Patent [19]

Haberl

[11] 4,228,052
[45] Oct. 14, 1980

[54] METHOD OF MIXING MATERIALS OF CONSTRUCTION WITH MINOR AMOUNTS OF ADDITION AGENTS

[76] Inventor: Paul Haberl, Klein Wolkersdorf 129, Austria

[21] Appl. No.: 881,559

[22] Filed: Feb. 27, 1978

[51] Int. Cl.$^2$ ............................................. C08L 95/00
[52] U.S. Cl. ............................ 260/28.5 AS; 427/222; 106/308 M; 106/282; 260/2.3
[58] Field of Search ................. 427/222, 290; 428/407; 106/308 M, 282; 260/2.3, 816 G, 28.5 AS

[56] References Cited

U.S. PATENT DOCUMENTS

| | | | |
|---|---|---|---|
| 2,215,435 | 9/1940 | Hal | 260/816 G |
| 2,422,480 | 6/1947 | Gordon | 260/816 G |
| 2,614,292 | 10/1952 | William | 427/222 |
| 2,767,149 | 10/1956 | Wendrow | 260/2.3 |
| 2,800,462 | 7/1957 | Sverdrup | 260/2.3 |
| 2,839,422 | 6/1958 | Beyer et al. | 427/222 |
| 2,871,206 | 1/1959 | Mankowich | 260/2.3 |
| 2,895,939 | 7/1959 | Stober | 428/407 |
| 3,012,900 | 12/1961 | Kleinmann | 427/222 |
| 3,338,849 | 8/1967 | Johnson | 260/2.3 |
| 3,344,212 | 9/1967 | Francis | 427/222 |
| 3,386,925 | 6/1968 | Dillhoefer | 260/2.3 |
| 3,505,260 | 4/1970 | Woodruff | 106/282 |
| 3,634,510 | 1/1972 | Himmelreich | 427/222 |
| 3,935,124 | 1/1976 | Thene | 260/816 R |

*Primary Examiner*—Sam Silverberg
*Attorney, Agent, or Firm*—Toren, McGeady and Stanger

[57] ABSTRACT

Pre-stressed polyethylene foil is shredded mechanically in a closed vessel, whereby it is heated until it shrinks and its surface becomes tacky. When latex is sprayed into the vessel, a thin rubber layer covers each foil fragment and is thermally welded to the polymer surface. The rubber layer traps pockets of aqueous latex in voids of the shrunken foil. The weight and bulk of the resulting material are much greater than the corresponding properties of its rubber content so that precisely measured amounts of rubber may be dispersed quickly and uniformly in hot asphalt for improving the properties of a road surface made from the asphalt mixture. The water content of the rubber-coated plastic fragments improves the working properties of the asphalt mixture.

2 Claims, No Drawings

METHOD OF MIXING MATERIALS OF CONSTRUCTION WITH MINOR AMOUNTS OF ADDITION AGENTS

The invention relates to a particulate material of construction containing synthetic polymer particles, preferably particles of thermoplastic material, to whose surfaces at least one material of a different kind adheres.

It is frequently required in various branches of construction work to admix one or more addition agents to a predominant basic component in precisely determined amounts in the most homogeneous distribution possible. Such addition agents for concrete include setting accelerators and retarders, fillers for increasing the porosity or for modifying the thermal and/or acoustical insulating properties, etc. Addition agents for soil or road surfaces serve for improving adhesion of a bituminous binder to mineral components and other fillers, for improving the fluidity or for modifying the foaming characteristics of the mixture etc.

It was necessary heretofore to add such agents, which are frequently used in combinations, to the basic component in a certain sequence and under precisely controlled conditions, particularly at controlled temperatures and humidities, and within a predetermined time. Difficulties were encountered frequently, particularly during use of combinations of addition agents, because some agents are difficult to distribute uniformly in the basic component and therefore require a mixing period of certain minimum length. This applies particularly to viscous basic components such as asphalt and other bituminous masses of the type employed for road construction and as floor coverings. The processes employed heretofore for incorporating addition agents are time consuming, a fact which unfavorably affects the cost of the mixing operation, but also the quality of the resulting mixture because some addition agents, such as thermoplastic synthetic resin compositions, are sensitive to elevated temperatures, particularly if exposed to such temperatures for extended periods of time. Lengthy heating periods, however, are often unavoidable for the reasons presented above.

It is an object of this invention to avoid the aforedescribed shortcomings and difficulties inherent in known procedures, and to facilitate the admixture of even a multiplicity of addition agents to a predominant basic component.

This object is achieved according to the invention by having substantial, extensive portions of the surfaces of polymer particles covered by the addition agent which is of a different nature. The polymer particles thus provide carriers for the addition agent. Addition agents may be incorporated in the basic component in any desired combination by means of the polymer particles and distributed in the basic component by means of the polymer particles without encountering the aforedescribed difficulties. The polymer particles do not adversely affect the properties of the basic component, and may actually be desirable in most cases, for example in the construction of roads or floor coverings, for improving the properties of the resulting mixtures.

Polymer particles carrying other materials as adhering impurities are known. Because the impurities are present in uncontrolled quantity and quality, the effect of the particles on the properties of a material to which they are added is not predictable. This invention makes it possible to control the properties of a basic construction material mixed with the polymer particles and the adhering addition agents in any desired manner, in the simplest case, by measuring the amount of the added polymer particles which carry a known or measured amount of addition agent. This procedure obviates difficulties that may arise from the fact that several addition agents simultaneously added may differ in shape and state of matter, for example, be solid, liquid, angular or round, of different particle size and temperature. The effects of these differences are eliminated or at least mitigated by the fact that the several addition agents are bound to polymer particles, whereby admixture to the basic component is facilitated and the proper time at which the addition agents are added to the basic component is readily selected.

No difficulties are encountered in working with addition agents which are not normally solid at ordinary temperature. It is readily possible within the scope of the invention to coat the polymer particles over substantial, extended portions of their surfaces with a layer of the addition agent, and such a layer may be continuous. It is possible in this manner to incorporate, for example, latex, polychloroprene etc. into the basic component. The surface layer may also consist of juxtaposed, finely granular particles, such as chalk, cellulose, powdered limestone, etc. Because the coating particles adhere to the surface of the polymer particles, the coating particles are not stripped off during storage, during transportation or during mixing of the polymer particles with the basic component. The finely granular coating particles may consist of organic materials, for example, of saw dust, but also of inorganic materials, for example sand, silicates, or metal powder.

It is a particular advantage of this invention that waste materials not otherwise capable of being disposed of or of being utilized may be incorporated in a basic component of a material of construction to exert on the same a beneficial effect. This is possible, for example, with natural or synthetic rubber or rubber-bearing materials which have a favorable effect on road or floor surfacing materials to which they are admixed. Such rubber waste may consist, for example, of comminuted automotive tires. It is possible to cover the polymer particles according to the invention entirely or in part with a layer of rubber.

It is not necessary for performing this invention that the polymer particles have any particular shape, such as that of a sphere or cube, although such shapes are readily prepared by granulation. It is also possible according to the invention that the polymer particles consist of thermally shrunk foils and be provided with interior voids enclosing other materials including the addition agent or agents. It is readily possible in this manner to incorporate in a basic component addition agents which are in the liquid state. According to the invention, the voids contain at least one liquid, particularly water, oil, salt solutions, emulsions or natural or synthetic rubber, such as polychloroprene etc. The addition agents of the invention, of course, may also include salts, amines, or fatty acid derivatives, but they may also include bitumen, natural asphalt or pitch. These materials are generally tacky, but their tackiness may be remedied by further coating with another material, for example, a coating of rubber, latex or the like.

Suitable synthetic polymeric materials or plastics include, but are not limited to, thermoplastic synthetic resin compositions, particularly polyolefins, preferably polyethylene and polypropylene, but also polystyrene, polyester, polyvinyl chloride and the like. Thermoplastic materials have the advantage that adhesive bonding thereof to the addition agents proper can be brought about by heating the polymer particles. Another bonding effect may be achieved with all polymers, including those that are not thermoplastic, by treatment of the polymer surfaces with suitable solvents. The polymer particles need not consist of virgin material because plastic scrap, particularly regenerated plastic, may be employed to advantage. The individual particles of the plastic may be colored which permits different products to be identified by suitable coloring, also by selection of the particle shape and size to avoid confusion. Compositions prepared in the form of dusting materials of different particle sizes may be added in a particularly simple manner to basic components of materials of construction.

A method of the invention for producing the coated carriers of the invention is characterized substantially in that polymeric material, preferably in the form of foil, is comminuted, and its surface is rendered tacky, preferably by heating, whereupon the material is mixed with the addition agent in the tacky condition. As mentioned above, heating causes the surface of a thermoplastic synthetic resin composition to become tacky which is generally sufficient for providing adequate adhesive bonding of the addition agent proper. If such bonding cannot be achieved or not achieved adequately, the surface may be rendered adhesive by means of a suitable solvent. It is particularly simple, according to the invention, to comminute a polymeric material in a vessel by means of rotating blades, to raise the material temperature thereby at least to a condition of surface tackiness, but not far beyond the softening temperature, and to cool the polymer material after mixing with the addition agent. Such cooling preferably occurs suddenly, preferably by introducing water into the vessel. The water practically instantaneously chills the plastic particles after they had been heated to the limit of their softening range by the energy input of the motor driving the comminuting devices so that the particles are prevented from adhering to each other.

The addition agent may be entered into the vessel jointly with the plastic to be comminuted, but it is preferably introduced only after the polymer has reached a state of tackiness. The added amount of water generally is evaporated in the vessel and during discharge of the treated material by the stored thermal energy of the comminuted material, but it is within the scope of the invention to retain a portion of the water in the plastic particles. This may be of advantage if the addition agent is an aqueous latex emulsion whose water content is partly retained in the coated particles. This aqueous residue evaporates during introduction of the particulate composition into the normally hot basic component, such as bitumen or asphalt, and the residual water fraction, whose amount is readily controlled, is utilized for improving the mixing process and for improving the workability of the mixture by means of road building equipment. Water also favorably affects manual working of the mixture. The application of floor and road coating compositions based on bituminous materials (melted asphalt, rolled asphalt, cement-asphalt mixtures), but also of other road surface coatings, is facilitated by the evaporating water, and the productivity of labor is increased beyond that already achieved by the use of the polymer material.

As mentioned above, the coated polymer particles of the invention may be applied in numerous branches of construction work. By way of example, polychloroprene, a synthetic rubber, may be introduced into heated bituminous road building compositions in the form of latex in a simple manner. As is well known, polychloroprene not only resists aging, but also elevated temperatures up to 260° C. The last-mentioned temperature is not readily avoided during modification of heated bituminous compositions by means of addition agents.

Rubber, as an addition agent, also may be dissolved in oil. Because bitumen consists of asphaltenes and malthenes, the oily phase of the bitumen is then coupled or combined with another oily phase, whereby wetting of the mineral fillers present is improved. The rubber addition to the bituminous basic component increases toughness and adds elasticity to the normal plasticity of the mixed material. The tendency of a bituminous material to crack at very low temperatures is reduced by the rubber addition, and continuous loadability under dynamic loading is improved.

Whereas adding rubbery or oily substances to a bituminous base created problems heretofore both as to dosage and as to homogeneous distribution of the addition agent in the bitumen, the invention permits easy and precise dosage because the amount of oil or rubber secured to the polymer particles is readily controlled. Because no significant difficulty is encountered in distributing the granular polymer particles in heated bitumen with adequate homogeneity, the addition agents adhering to the polymer particles are distributed in a corresponding homogeneous manner. The same advantage is available relative to adhesion enhancing agents and other addition agents which are employed in bituminous road building material, such as amines, salts, and fatty acid derivatives.

The addition agents may be admixed to bituminous basic components by means of dosing equipment conventional in asphalt plants when carried by polymer particles of the invention because an adequately precise dosing of the granular, freely flowing material does not present any problem. The adhesiveness of a bituminous binder to mineral aggregate and other mineral ingredients (fillers) may be improved significantly by this invention.

Other fields of application of the coated polymer particles of the invention reside in the addition of agents for improving the fluidity of the bituminous mixture during construction, of agents for controlling foaming of the mixture, of agents for reducing the working temperature, etc.

These addition agents may be applied to the carrier material (that is, the polymer particles) in greatly different amounts and in combinations adapted for the intended use, and mixed homogeneously with the basic component without tending to separate.

The material of the invention is capable of practically unlimited storage without loss of dusting or flowing properties. Because the coating of addition agent adheres firmly to the polymer particles, the addition agent or agents cannot be stripped from the polymer particles by the effects of humidity, for example by rain.

Many liquids may be used according to the invention as addition agents for basic components of material of construction. Because most polymers are insensitive to many acids and alkaline materials, such active chemical agents may be bonded to the polymeric carrier material without damaging the latter, and may be incorporated in the basic component in this manner, not being harmful thereafter. For example, the surfaces of polyolefin particles (particularly polyethylene) are readily coated with waste oil which may contain dissolved or finely dispersed rubber. Each polymer particle is coated over a major portion of its surface with a layer of oil or rubber and is not tacky. In this manner, the sticking of adjacent particles can be avoided even when substances tacky in themselves are used.

As mentioned above, the polymer particles of the invention may be produced by granulating, but it is particularly advantageous to use shrunk foil particles, so-called agglomerates, because they have a large surface area and are additionally formed with voids in which the addition agent or agents may be retained. Such agglomerates are formed when foils of shrinkable plastic, particularly polyethylene are torn and thermally shrunk. The applied heat causes not only shrinking of the foil pieces, but tackiness of the particle surfaces, whereby addition agents mixed with the agglomerate particles are readily bonded adhesively.

The following Example is further illustrative of the method of coating a thermoplastic carrier with an addition agent for a bituminous road or floor surfacing composition, and to the mixing of the coated carrier with the basic component of the composition. All percentage values in this Example are by weight.

EXAMPLE

An upright cylindrical vessel having a diameter of one meter was equipped with eight blades attached to the cylindrical wall and two knives mounted on a coaxial shaft for shearing cooperation with the stationary blades. Polyethylene foil scrap was cut and torn in the vessel when the shaft was turned at 1600 RPM, and the shearing action of the blades raised the temperature of the thermoplastic material to about 90° C., causing softening, tackiness and shrinking of the foil fragments. When the temperature in the vessel approached 100° C., a polychloroprene latex (Baypren Latex B-58, a commercial product of Bayer A.G., Leverkusen, Germany) consisting of equal weights of water and synthetic rubber, was sprayed into the vessel. Contact with the cold latex caused the polyethylene particles to disintegrate. Much of the water content of the latex was evaporated, and the heat of vaporization cooled the polyethylene particles which became coated fairly uniformly with a non-tacky layer of rubber. Some water and latex was trapped in voids of the polyethylene pieces which had been sealed by a rubber layer. The resulting product was granular, though of irregular contour, non-tacky and free-flowing and could be stored in bags for later use.

In a series of runs, the ratio of polyethylene scrap and latex was varied to produce batches of rubber coated plastic particles containing 20%, 25%, and 40% rubber based on 100% polyethylene on a dry basis, also approximately 5% water. The rubber coating adhered firmly to the polyethylene particles. The coated particles varied in size from about 1 mm to about 10 mm.

In a further run, the shredded, hot and tacky polyethylene fragments were dusted uniformly with powdered natural rubber in an amount of 10% based on the polyethylene weight. The powdery material firmly attached itself to the plastic surface, and could not be rubbed off readily after cooling of the substrate below its softening temperature. This product was similar in its mechanical and dimensional properties to the latex-coated polyethylene particles, but lacked the trapped pockets of water.

A commercial grade road paving asphalt (Bitumen, Type B-80, of Shell A.G., Germany) was mixed readily and uniformly by stirring for one hour at 175° C. with 3%, 5%, and 10% (based on the asphalt weight) of each of the rubber-carrying polyethylene batches except for the 40% batch which was used only in amounts of 3% and 5%. The asphalt mixtures so produced were tested for penetration, softening temperature, ductility, breaking point, toughness, tenacity, elasticity, and flow length.

Penetration was tested according to German Industrial Standard 52 010 (penetration in $10^{-1}$ mm by a needle under a load of 100 g in 5 seconds at 25° and 0° C.). The softening point was determined by the ring and ball method of German Industrial Standard DIN 52 011. Ductility is expressed as the elongation (cm) of a test body standardized under DIN 52 013 when stretched to failure at 5 cm/min. at 4° C. Breaking point is the temperature at which a film fails in flexure under the conditions of loading and cooling of DIN 52 012. Toughness and tenacity were determined in newton-mm according to a method originally developed by scientists at Du-Pont de Nemours & Co., and now commonly accepted. Elasticity was determined in a standardized torsional recovery test also developed by the afore-mentioned scientists and commonly accepted now. Recovery of a test specimen 30 second and 30 minutes after release of an applied stress was measured. In the determination of flow length, a standardized specimen of the asphalt mixture was placed on a surface inclined at an angle of 75°, and the downward flow (in mm) after one hour at certain temperatures was measured.

The results of the tests are shown in the attached Table.

The particle size and shape of the material of this invention may be varied. Generally, the particles have a size of a few millimeters, at least 1 and up to 10 mm. The shape of the particles is irregular if they were formed from foil agglomerates. When granular material is employed as a carrier, it may be prepared by conventional granulation. The dimensions of the particles are approximately the same regardless of the manner of production, and of the order of several millimeters, not exceeding one centimeter.

TABLE

| % Rubber on carrier | 0 | 10 | 10 | 10 | 20 | 20 | 20 | 30 | 30 | 30 | 40 | 40 |
|---|---|---|---|---|---|---|---|---|---|---|---|---|
| % additive in asphalt | 0 | 3 | 5 | 10 | 3 | 5 | 10 | 3 | 5 | 10 | 3 | 5 |
| Penetration,$10^{-1}$mm, 0° C. | 52 | 62 | 63 | 51 | 58 | 41 | 29 | 41 | 40 | 36 | 23 | 30 |
| Penetration,$10^{-1}$mm, 25° C. | 13 | 15 | 16 | 18 | 10 | 7 | 11 | 10 | 10 | 9 | 7 | 7 |
| Softening point, °C. | 51 | 52 | 56 | 64 | 53 | 58 | 67 | 60 | 61 | 95 | 67 | 66 |
| Ductility, cm | 7 | 6 | 6 | 3.5 | 6.5 | 6 | 6.5 | 5 | 4 | 6.5 | 0.5 | 0.5 |
| Breaking point, —°C. | 12 | 6 | 5 | 5 | 11 | 12 | 18 | 19 | 20 | 18 | 10 | 20 |
| Toughness, newton-mm | 4.2 | 4.4 | 4.3 | 2.0 | 5.0 | 5.4 | 2.2 | 3.6 | 4.0 | 2.2 | 4.1 | 2.6 |
| Tenacity, newton-mm | 2 | — | — | — | — | — | 0.3 | — | — | — | — | 0.2 |
| Elasticity, %, after 30 sec. | 12.2 | 11.1 | 11.7 | 13.9 | 11.7 | 11.7 | 12.2 | 5.6 | 11.7 | 8.9 | 8.3 | 13.9 |
| Elasticity, %, after 30 min. | 13.9 | 13.9 | 14.5 | 18.9 | 13.3 | 16.1 | 17.2 | 11.1 | 16.1 | 11.1 | 13.9 | 18.9 |

TABLE-continued

| | | | | | | | | | | | | |
|---|---|---|---|---|---|---|---|---|---|---|---|---|
| Flow length, 38° C. | 20 | 10 | 9 | 0 | 7 | 5 | 0 | 2 | 0 | 0 | 0 | 0 |
| Flow length, 49° C. | 55 | 51 | 35 | 0 | 48 | 19 | 3 | 19 | 0 | 0 | 0 | 7 |
| Flow length, 60° C. | 140 | 125 | 114 | 0 | 140 | 102 | 7 | 83 | 0 | 0 | 29 | 34 |

What is claimed is:

1. A method of adding a measured amount of at least one addition agent to a basic component which comprises:
    (a) mechanically comminuting a plurality of unitary bodies of a polyolefin until each of said bodies is converted to a multiplicity of particles and said particles are heated by said comminuting to a temperature at which the surfaces of said particles are tacky;
    (b) contacting the tacky surfaces of said particles with said amount of said at least one addition agent and thereby securing said at least one addition agent to said surfaces as a surface coating,
        (1) said amount being smaller than than the weight of said particles;
    (c) cooling the coated particles below said temperature; and
    (d) thereafter, substantially uniformly dispersing the coated particles in said basic component; wherein said at least one addition agent includes an elastomer dispersed as a latex in an aqueous medium, a portion of the water in said latex being retained in the coated particles, and the remainder of said water being evaporated from the coated particles prior to said dispersing.

2. A method of adding a measured amount of at least one addition agent to asphalt which comprises:
    (a) mechanically comminuting a plurality of unitary bodies of a polyolefin until each of said bodies is converted to a multiplicity of particles and said particles are heated by said comminuting to a temperature at which the surfaces of said particles are tacky;
    (b) contacting the tacky surfaces of said particles with said amount of said at least one addition agent and thereby securing said at least one addition agent to said surfaces as a surface coating,
        (1) said amount being smaller than the weight of said particles;
    (c) cooling the coated particles below said temperature; and
    (d) thereafter, substantially uniformly dispersing the coated particles in said asphalt, wherein said particles are foil fragments enclosing voids, said at least one addition agent includes an aqueous dispersion of a rubber, said liquid being at least partly secured in said voids by said surface coating.

* * * * *